United States Patent [19]
Aliev et al.

[11] 3,867,471
[45] Feb. 18, 1975

[54] METHOD FOR PREPARING BUTADIENE AND ISOPRENE

[76] Inventors: Vagab Safarovich Aliev, ulitsa Nizami, 66, blok. 5, kv. 40; Adilya Khanum Panakh Kyzy Kasimova, prospekt Lenina, 3, kv. 18; Mariam Efimovna Muravchik, Kommunistichesky pereulok, 4, kv. 20; Beniamin Georgievich Ter-Sarkisov, ulitsa 28 aprelya 14, kv. 2; Shamil Kyazim Ogly Kyazimov, 4 Chernogorodskaya ulitsa, 11, ku.3, all of Baku, U.S.S.R.

[22] Filed: Feb. 2, 1973

[21] Appl. No.: 329,169

[52] U.S. Cl. .......... 260/680 R, 252/457, 260/680 E
[51] Int. Cl. .............................................. C07c 5/18
[58] Field of Search ..................... 260/680 R, 680 E

[56] References Cited
UNITED STATES PATENTS

| | | | |
|---|---|---|---|
| 2,370,797 | 3/1945 | Kearby | 260/680 |
| 3,050,572 | 8/1962 | Masterton et al. | 260/680 |
| 3,118,007 | 1/1964 | Kronig et al. | 260/680 |
| 3,453,344 | 7/1969 | Aliev et al. | 260/680 |

*Primary Examiner*—Paul M. Coughlan, Jr.

[57] ABSTRACT

The method for preparing hydrocarbons consists of dehydrogenating olefinic hydrocarbons, namely n-butylenes or isoamylenes under isothermal conditions at a temperature of 560° – 600°C over a catalyst consisting of 35 – 50 per cent by weight of $Cr_2O_3$, 20 – 30 percent of $Fe_2O_3$, 20 – 25 percent of ZnO and 0.5 – 2 per cent by weight of $SiO_2$, with dilution of the starting hydrocarbons with steam in the molar ratio of 1 : 10–20. The said dehydrogenating is effected in a rising current which is a mixture of the starting hydrocarbons, the catalyst and steam, the concentration of the catalyst in said current being 5 – 60 kg/cu.m. Spent catalyst is continuously separated from said current and is recovered in the down-going current. The recovery of the catalyst is effected in a fluid catalyst bed with air at a temperature of 570° – 590°C. The recovered catalyst is continuously returned into the dehydration process, the amount of the catalyst circulating in the system being 80 – 200 times that of the starting hydrocarbons. The reaction products are withdrawn from the system and separated. The proposed method is carried out on a continuous scale and ensures high yields of products (up to 65 percent by weight with respect to the starting hydrocarbons fed into the system), the conversion of the starting hydrocarbons and the selectivity of the process being high.

2 Claims, No Drawings

METHOD FOR PREPARING BUTADIENE AND ISOPRENE

This invention relates to methods for preparing diolefinic hydrocarbons, and more particularly it relates to a method for preparing butadiene or isoprene which are starting materials in the manufacture of divinylstyrene and isoprene rubbers.

Methods are known in the prior art for preparing diolefinic hydrocarbons, namely butadiene or isoprene, by dehydrogenation of olefinic hydrocarbons n-butylenes or isoamylenes over a stationary bed of a catalyst under adiabatic conditions. The dehydrogenation process is carried out under batch conditions to ensure conditions for recovery of the catalyst with air. These methods differ from one another by the catalysts used in the process, the duration of the dehydrogenation and the catalyst recovery cycles, and also by the yields of the main products (See N.Y. Tiuriaev, "Physicochemical and technological principles of preparing butadiene from butane and butylenes" p. 166, "Khimia," Moscow, 1966).

A method is also known for preparing butadiene or isoprene by dehydrogenation of n-butylenes or isoamylenes over a stationary bed of a catalyst consisting of $Cr_2O_3$, $Fe_2O_3$, ZnO and $SiO_2$. The dehydrogenation is effected under adiabatic conditions at a temperature from 600° to 620°C, with dilution of the starting hydrocarbons with steam (the molar ratio of the starting hydrocarbons to steam being 1:10) and space velocity of the hydrocarbon raw materials of 800 hour$^{-1}$. The starting hydrocarbons are dehydrogenated and the spent catalyst is recovered with air in one reactor, the dehydrogenation and the recovery cycles alternating. The duration of the dehydrogenation process is 6 hours, and that of the catalyst recovery, one hour. The yield of butadiene and isoprene in said method is 17–18 percent by weight calculated with reference to the raw material feed, the selectivity of the process being 70 – 75 percent by weight.

Another known method for preparing butadiene or isoprene consists in dehydrogenation of n-butylenes or isoamylenes over a stationary bed of calcium-nickel-phosphate catalsyt. The dehydrogenation is effected under adiabatic conditions at a temperature from 600° to 620°C, with dilution of the starting hydrocarbons with steam (the molar ratio of the raw hydrocarbons to steam being 1:10) and at a volumetric delivery rate of the raw hydrocarbons of 120–170 hour$^{-1}$. The method is also a periodic process. The dehydrogenation cycle is continued for 15–30 minutes and then the reactor is operated for recovery of the spent catalyst with air, the recovery cycle continuing for 15 minutes. The yield butadiene and isoprene in said method is 33 percent by weight with respect to the feed, the selectivity of the process being 80 – 82 percent by weight.

The disadvantage inherent in all known methods for preparing butadiene or isoprene is the low yield of the main products, and the intermittency of the dehydrogenation and the recovery processes, both cycles being short.

A method is also known in the prior art for preparing butadiene or isoprene by oxidative dehydrogenation of olefinic hydrocarbons namely, n-butylenes or isoamylenes over a stationary bed of a catalyst consisting of 35–50 percent by weight of $Cr_2O_3$, 20 – 30 percent by weight of $Fe_2O_3$, 20 – 25 percent by weight of ZnO and 0.5 – 2 percent by weight of $K_2O$, with delivery of oxygen into the reaction zone. The dehydrogenation process is carried out under isothermal conditions at temperatures from 560° to 600°C, with dilution of the starting hydrocarbons with steam (the molar ratio of the starting hydrocarbons to the steam being 1:10 – 20) and the volumetric delivery rate of the raw material of 500–800 hour$^{-1}$ (See British Pat. No. 1,178,475). The yield of butadiene and isoprene in said method is 36–40 percent by weight with respect to the raw hydrocarbon feed, the selectivity of the process being 82 – 86 percent by weight.

The described method is carried out on a continuous basis without special process for recovery of the catalyst, since the catalyst is "auto-recovered" in the process of dehydrogenation. However, considerable amounts of oxygen are consumed in the process (the molar ratio of oxygen to the starting hydrocarbons is 0.3–1:1) which involves high energy requirements. Moreover, the yields of the main products in this method are relatively low.

The object of this invention is to work out a continuous method for preparing diolefinic hydrocarbons, butadiene or isoprene, which would ensure higher yields of the main products.

Another object of the invention is also to work out a method for preparing diolefinic hydrocarbons butadiene or isoprene which would ensure decreased energy requirements.

In accordance with these and other objects, the invention consists in dehydrogenating that olefinic hydrocarbons, namely, n-butylenes or isoamylenes under isothermal conditions at temperatures from 560° to 600°C over a catalyst consisting of 35 – 50 percent by weight of $Cr_2O_3$, 20 – 30 percent by weight of $Fe_2O_3$, 20 – 25 percent by weight of ZnO and 0.5 – 2 percent by weight of $SiO_2$, with dilution of the starting hydrocarbons with steam in the molar ratio of 1:10 – 20. According to the invention, the dehydrogenation is effected in an up-flowing current of a mixture of the starting hydrocarbons, the catalyst and steam, the concentration of the catalyst in said current being 5–60 kg/cu.m., preferably 15 – 20 kg/cu.m.

The spent catalyst is separated continually from the reaction products in said current, and delivered in a down-flowing current for recovery. The recovery of the catalyst is carried out in a fluidized bed of the catalyst with air at a temperature from 570° to 590°C. The recovered catalyst is continually returned into the dehydrogenation process, the amount of the catalyst circulating in the system being 80–200 times that of the starting hydrocarbons. The above-named reaction products (after separation of te catalyst) are withdrawn from the system and subjected to separation.

As has been stated above, the catalyst used for dehydrogenation of n-butylenes and isoamylenes contains the highest oxide of iron $Fe_2O_3$ which is converted in said process into the lowest oxide FeO to liberate oxygen which is combined with hydrogen freed in the dehydrogenation process, thus facilitating the course of the reaction along the required path. Part of the oxygen is consumed for burning coke deposited on the catalyst, which maintains the activity of the catalyst in the dehydrogenation process for a longer time.

According to what has been said above, the spent catalyst is separated from the reaction products and recovered with hot air to burn out the coke deposited on its surfaces. The ferrous oxide FeO contained in the spent catalyst is again converted into the ferric oxide $Fe_2O_3$ in the oxidizing medium of the recovery process.

The realization of a continuous process of dehydrogenation of hydrocarbon raw materials in an up-flowing current which is a mixture of the starting hydrocarbons, the catalyst and steam, ensures the high ratio of the catalyst circulating in the system with respect to the starting hydrocarbons. This, in turn, increases the yield of the main products (up to 65 percent by weight with respect to the hydrocarbon feed), the conversion of the starting hydrocarbons being 74 percent by weight and the selectivity of the process up to 89.6 percent by weight.

Owing to a continuous supply of heat together with the recovered catalyst, and also the presence of oxygen liberated by the catalyst in the reaction zone and consumed in the dehydrogenation process for burning coke deposits, the required temperature of the hydrogenation process is ensured and the process proceeds under isothermal conditions.

The method for preparing diolefinic hydrocarbons butadiene or isoprene is carried out as follows.

The starting hydrocarbons, namely the butane-butylene fraction consisting of 9–10.7 percent by weight of n-butane, 70–77 percent by weight of n-butylenes, 4 – 5.3 percent by weight of butadiene and 7 percent by weight of hydrocarbons having the number of carbon atoms from 5 and over, or isoamylene fraction consisting of 90–95 percent of isoamylene and 5 – 10 percent by weight of n-amylenes, are heated and mixed with steam at a temperature of 560°–570°C, the molar ratio of the starting hydrocarbons to steam being 1:10–20. Simultaneously, the recovered catalyst consisting of 35–50 percent by weight of $Cr_2O_3$, 20 – 30 percent by weight of $Fe_2O_3$, 20 – 25 percent by weight of ZnO and 0.5 – 2 percent by weight of $SiO_2$ and having a specific surface of 6.8–21.2 sq.m. per gram is delivered from the regenerator into the mixing chamber. The mixture of the starting hydrocarbons with steam and the catalyst is delivered in a continuous up-flowing current into the dehydrogenation reactor. The dehydrogenation temperature is 560°–600°C (the preferable dehydrogenation temperature for the butane-butylene fraction is 580° – 590°C and for the isoamylene fraction, 560°–570°C), the concentration of the catalyst in the rising current is 5–60 kg/cu.m. and the time during which the starting hydrocarbons are in contact with the catalyst is from 0.1 to 1 second. The reaction products, in the form of a gas, are delivered together with the steam and the spent catalyst from the reactor into a tempering device, where they are cooled to a temperature from 530° to 540°C by water condensate for the purpose of ruling out further conversions of the main products, butadiene and isoprene, which are part of the contact gas. The said mixture (contact gas, steam and spent catalyst) from the tempering device is delivered into a separator where particles of spent catalyst are separated from the contact gas and steam. The spent catalyst from the separator is delivered for recovery in a down-flow current falling under the force of gravity. The catalyst is recovered in a fluidized bed of the catalyst at a temperature from 570° to 590°C with air. Coke deposited on the spent catalysst is burned out in this process. The recovered catalyst from the generator is delivered continually into the above-named mixing chamber, where it is mixed with hydrocarbon raw material and water vapor. The mixture is returned in a continuous flow back into the reactor for dehydrogenation.

Thus, the method is carried out continuously with uninterrupted circulation of the catalyst in the system, the amount of the catalyst circulating being 80–200 with times that of the starting hydrocarbons.

After the catalyst has been separated from said mixture of the contact gas, steam and spent catalyst, the contact gas is separated into its component parts to isolate the main products. The separation is carried out by any of the known methods. Thus, for example, if a butane-butylene fraction is used as the starting hydrocarbon, the contact gas consisting of carbon dioxide, hydrogen, methane, ethane, ethylene, propane, propylene, n-butane, n-butylene, butadiene and oxygen-containing compounds in mixture with steam, is delivered from the separator to the condenser unit. The steam and oxygen-containing compounds are condensed and separated from the other products contained in the contact gas. Then, volatile components, such as hydrogen, carbon dioxide and hydrocarbons containing up to four carbon atoms, are separated by rectification under pressure. The remaining mixture contains n-butane, n-butylenes and butadiene. n-Butane is separated from it by azeotropic distillation. Butadiene is separated from its mixture with n-butylenes by ammonium salts of copper which form unstable complexes with butadiene.

For a better understanding of this invention, the following examples are given by way of illustration:

EXAMPLE 1

The butane-butylene fraction was dehydrated under isothermal conditions in a rising flow which was a mixture of the starting hydrocarbons, the catalyst, and the steam. The said butane-butylene fraction consisted of 10.7 percent by weight of n-butane, 77 percent by weight of butylenes, 5.3 percent by weight of butadiene and 7 percent by weight of hyrocarbons having carbon atoms from 5 and over. The catalyst consisted of 50 percent by weight of $Cr_2O_3$, 25 percent by weight of $Fe_2O_3$, 23 percent by weight of ZnO and 2 percent by weight of $SiO_2$ and had a specific area of 21.2 sq.m. per gram. The concentration of the catalyst in the rising flow was 10 kg/cu.m.: the molar ratio of the starting hydrocarbons to steam was 1:15. The process of dehydrogenation was carried out at a temperature of 590°C, the contact time was 0.2 second, and the molar ratio of oxygen liberated by the catalyst to n-butylenes was 0.5 : 1.

The products of dehydrogenation of said material in the specified conditions were contact gas (99 percent by weight) and coke (1 percent by weight) which deposited on the spent catalyst. The calculations were made with reference to the raw material feed. The obtained contact gas had the following composition (in percent by weight):

| | |
|---|---|
| carbon dioxide | 25.0 |
| hydrogen | 0.5 |
| methane | 0.6 |
| ethane + butylene | 0.6 |
| propane + propylene | 1.4 |
| n-butane | 8.9 |
| n-butylenes | 20.8 |
| butadiene | 42.0 |
| oxygen containing compounds | 0.2 |

The contact gas in a mixture with steam and spent catalyst was continuously discharged from the reactor. The spent catalyst was separated from the flow and recovered with air. The recovery was effected in a fluidized bed of the catalyst at a temperature of 580°C during which deposited coke was burned out. The recovered catalyst was continuously returned into the dehydrogenation process, the amount of the catalyst circulating being 80 times that of the starting hydrocarbons.

The main product (butadiene) and other products were separated from the contact gas.

The yield of butadiene was 60.2 percent by weight with respect to the butylenes in the feed and 86.5 percent by weight with respect to the decomposed n-butylenes, the conversion of n-butylenes being 69.5 percent by weight.

EXAMPLE 2

The butane-butylene fraction was dehydrogenated under isothermal conditions in a rising flow which was a mixture of the starting hydrocarbons, the catalyst and steam. The said butane-butylene fraction had a composition similar to that described in Example 1. The catalyst was 50 percent by weight of $Cr_2O_3$, 24.1 percent by weight of $Fe_2O_3$, 24.8 percent by weight of ZnO and 1.1 percent by weight of $SiO_2$, and had a specific area of 19.2 sq.m. per gram. The concentration of the catalyst in the rising flow was 15 kg/cu.m.; the molar ratio of the starting hydrocarbons to the steam was 1 : 17.5. The dehydrogenation process was effected at a temperature of 585°C, the contact time was 0.18 second and the molar ratio of oxygen liberated by the catalyst to n-butylenes was 0.6 : 1.

The products of dehydrogenation under said conditions were (with respect to the starting hydrocarbons) 99 percent by weight of the contact gas and 1 percent by weight of coke deposited on the spent catalyst. The prepared contact gas had the following composition, in percent by weight:

| | |
|---|---|
| carbon dioxide | 26.8 |
| hydrogen | 0.1 |
| methane | 0.3 |
| ethane + ethylene | 0.4 |
| propane + propylene | 0.6 |
| n-butane | 9.4 |
| n-butylenes | 17.7 |
| butadiene | 44.4 |
| oxygen-containing compounds | 0.3 |

The contact gas in a mixture with steam and the spent catalyst were continuously discharged from the dehydrogenator. The spent catalyst was separated from the flow and recovered with air in a fluidized bed of the catalyst at a temperature of 575°C to burn the coke deposited on the catalyst. The recovered catalyst was continuously returned into the reactor, the amount of the catalyst circulating in the system being 80 times that of the starting hydrocarbons.

The main product (butadiene) and the other products were separated from the gaseous effluent.

The yield of butadiene was 63.5 percent by weight with respect to the n-butylenes in the feed and 87.5 percent by weight with respect to the decomposed n-butylenes, the conversion of n-butylenes being 72.7 percent by weight.

EXAMPLE 3.

The butane-butylene fraction was dehydrogenated under isothermal conditions in a rising current which was mixture of the starting hydrocarbons, the catalyst and steam. The said butane-butylene fraction had a composition similar to that described in Example 1. The catalyst consisted of 49.5 percent by weight of $Cr_2O_3$, 26.4 percent by weight of $Fe_2O_3$, 23.5 percent by weight of ZnO and 0.6 percent by weight of $SiO_2$, and had a specific area of 12.5 sq.m per gram. The concentration of the catalyst in the flow was 40 kg/cu.m.; the molar ratio of the starting hydrocarbons to steam was 1 : 18. The dehydrogenation process was effected at a temperature of 565°C, the time during which the starting hydrocarbons were in contact with the catalyst was 0.2 second, and the molar ratio of oxygen liberated by the catalyst to the n-butylenes was 0.55:1.

The products of dehydrogenation of the starting hydrocarbons under said conditions (with respect to the feed of starting materials) were 98.9 percent by weight of gaseous product and 1.1 percent by weight of coke deposited on the spent catalyst. The gaseous product had the following composition, in percent by weight:

| | |
|---|---|
| carbon dioxide | 25.7 |
| hydrogen | 0.2 |
| methane | 0.1 |
| ethane + ethylene | 0.3 |
| propane + propylene | 0.4 |
| n-butane | 9.1 |
| n-butylenes | 21.2 |
| butadiene | 42.7 |
| oxygen-containing compounds | 0.3 |

The gaseous product in a mixture with steam and the spent catalyst were continuously discharged from the reactor. The spent catalyst was separated from the flow and recovered with air in a fluidized bed of the catalyst at a temperature of 575°C. The recovered catalyst was continuously returned into the reactor, the amount of the catalyst circulating in the system being 160 times that of the starting hydrocarbons.

The main product (butadiene) and other products were separated from the gaseous effluent.

The yield of butadiene was 61.3 percent by weight with respect to the n-butylenes in the feed and 89.6 percent by weight with respect to the decomposed n-butylenes, the conversion of n-butylenes being 68 percent by weight.

EXAMPLE 4

The butane-butylene fraction was dehydrogenated under isothermal conditions in a rising flow which was a mixture of starting hydrocarbons, the catalyst and steam. The said butane-butylene fraction had a composition similar to that described in Example 1. The catalyst consisted of 48.3 percent by weight of $Cr_2O_3$, 25.8 percent by weight of $Fe_2O_3$, 24.2 percent by weight of ZnO and 1.7 percent by weight of $SiO_2$ and had a specific area of 6.8 sq.m. per gram. The concentration of the catalyst in the rising flow was 60 kg/cu.m., the molar ratio of the starting hydrocarbons to the water vapor was 1 : 13. The dehydrogenation process was effected at a temperature of 595°C, the time during which the starting hydrocarbons were in contact with the catalyst was 0.2 second, and the molar ratio of the oxygen liberated by the catalyst to n-butylenes was 0.5 : 1.

The products of dehydrogenation of the starting hydrocarbons under the said conditions (with respect to the starting hydrocarbons in the feed) were 98.8 percent by weight of gaseous product and 1.2 percent by weight of coke deposited on the spent catalyst. The gaseous product had the following composition, in percent by weight:

| | |
|---|---|
| carbon dioxide | 37.7 |
| hydrogen | 0.3 |
| methane | 0.5 |
| ethane + ethylene | 0.5 |
| propane + propylene | 0.5 |
| n-butane | 8.4 |
| n-butylenes | 19.0 |
| butadiene | 32.8 |
| oxygen-containing compounds | 0.3 |

The gaseous product in a mixture with steam and the spent catalyst were continuously discharged from the reactor. The spent catalyst was separated from the flow and recovered with air in a fluidized catalyst bed at a temperature of 585°C. The recovered catalyst was returned into the reactor, the amount of the catalyst circulating in the system being 200 times that of the starting hydrocarbons.

The main product (butadiene) and the other products were separated from the gaseous effluent.

The yield of butadiene was 53.1 percent by weight with respect to the n-butylenes in the feed and 80 percent by weight with respect to the decomposed n-butylenes, the conversion of the n-butylenes being 66.7 percent by weight.

EXAMPLE 5

Isoamylene fraction was dehydrogenated under isothermal conditions in a rising flow consisting of a mixture of starting hydrocarbons, the catalyst and steam. The said isoamylene fraction consisted of 95 percent by weight of isoamylenes and 5 percent by weight of n-amylenes. The catalyst consisted of 45 percent by weight of $Cr_2O_3$, 30 percent by weight of $Fe_2O_3$, 24 percent by weight of ZnO and 1 percent by weight of $SiO_2$, and had a specific area of 20.2 sq.m. per gram. The concentration of the catalyst in the rising flow was 13 kg/cu.m.; the molar ratio of the starting hydrocarbons to steam was 1 : 16. The dehydrogenation process was effected at a temperature of 575°C, the time during which the starting hydrocarbons were in contact with the catalyst was 0.2 second and the molar ratio of the oxygen liberated by the catalyst to the isoamylenes was 0.5 : 1.

The products of the dehydrogenation of the starting hydrocarbons in the feed (with respect to the hydrocarbons) were 98.6 percent by weight of gaseous product and 1.4 percent by weight of coke deposited on the spent catalyst. The gaseous product had the following composition, in percent by weight:

| | |
|---|---|
| Carbon dioxide | 3.5 |
| hydrogen | 0.3 |
| methane | 1.0 |
| ethane + ethylene | 0.5 |
| propane + propylene | 0.6 |
| n-butane | 0.8 |
| n-pentane | 1.0 |
| isoamylenes | 25.6 |
| n-amylenes | 3.8 |
| piperylene | 0.5 |
| isoprene | 62.1 |
| oxygen-containing compounds | 0.3 |

The gaseous product in a mixture with steam and spent catalyst was discharged in a continuous flow from the dehydrogenation reactor. The spent catalyst was separated from the flow and recovered with air in a fluidized bed of the catalyst at a temperature of 570°C. The recovered catalyst was continuously returned into the dehydrogenation process, the amount of the catalyst circulating in the system being 80 times that of the starting hydrocarbons.

The main product (isoprene) and other products were isolated from the gaseous effluent.

The yield of isoprene was 64.9 percent by weight with respect to the isoamylenes in the feed and 87.6 percent by weight with respect to the decomposed isoamylenes, the conversion of the isoamylenes being 74 percent by weight.

What we claim is:

1. A method for preparing diolefinic hydrocarbons, selected from the group consisting of butadiene and isoprene, comprising dehydrogenating an olefinic hydrocarbon selected from the group consisting of n-butylenes and isoamylenes under isothermal conditions at a temperature from 560° to 600°C over a catalyst consisting of 35-50 percent by weight of $Cr_2O_3$, 20-30 percent by weight of $Fe_2O_3$, 20-25 percent by weight of ZnO and 0.5-2 percent by weight of $SiO_2$, with dilution of the starting hydrocarbon with steam in a molar ratio of 1 :10-20, said dehydrogenation being effected in a rising current which is a mixture of the starting hydrocarbon, the catalyst and steam, the concentration of said catalyst in said current being 5-60 kg/cu.m.; continuously separating the spent catalyst from the gaseous dehydrogenation reaction products and recovering said spent catalyst in a down-flowing current in a fluidized bed of the spent catalyst with air at a temperature of 570°-590°C; continuously returning the recovered catalyst to the dehydrogenation process, the amount of the catalyst circulating in the system being 80-200 times the amount of the hydrocarbon feed; withdrawing said reaction products from the system and separating said reaction products.

2. A method according to claim 1, in which the starting hydrocarbons are dehydrogenated in the presence of the said catalyst, the concentration of which in the current is 15-20 kg/cu.m.

* * * * *